May 18, 1943. M. G. KOFLER 2,319,330
APPARATUS FOR MAKING ENLARGEMENTS AND STILL
PICTURES FROM MOVING PICTURE FILM
Filed April 26, 1941 2 Sheets-Sheet 1
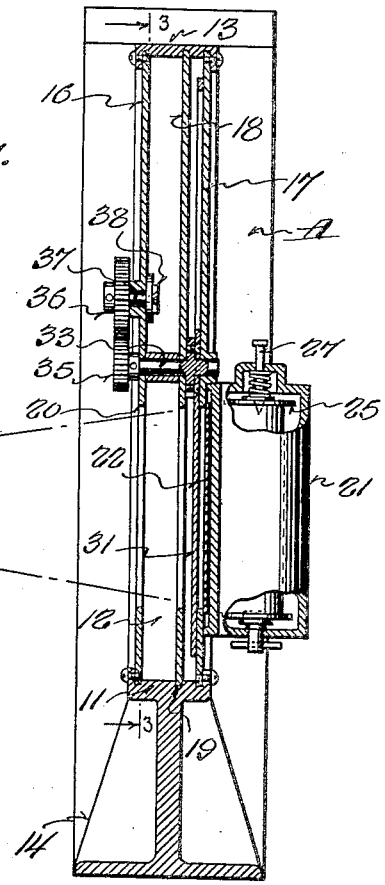
Fig. 1.
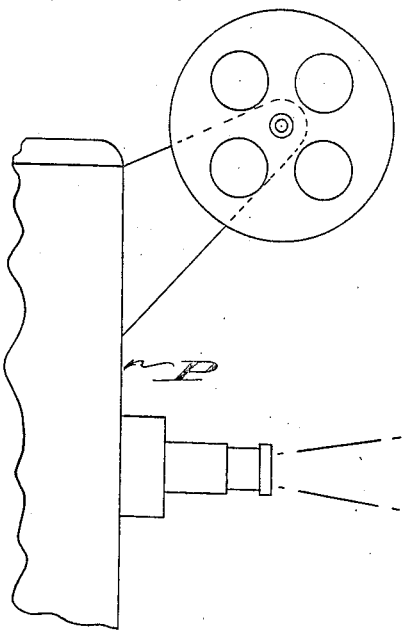
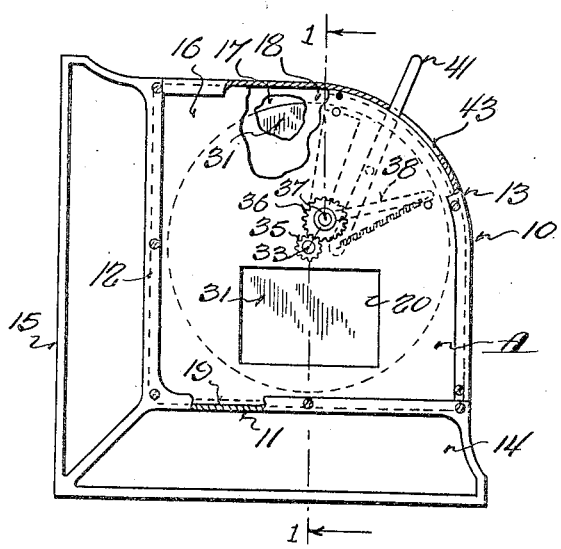
Fig. 2.
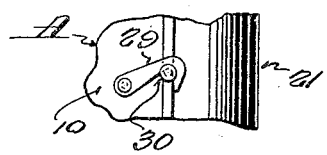
Fig. 6.
INVENTOR
M.G. KOFLER
BY
ATTORNEYS May 18, 1943.　　　M. G. KOFLER　　　2,319,330
APPARATUS FOR MAKING ENLARGEMENTS AND STILL
PICTURES FROM MOVING PICTURE FILM
Filed April 26, 1941　　　2 Sheets-Sheet 2
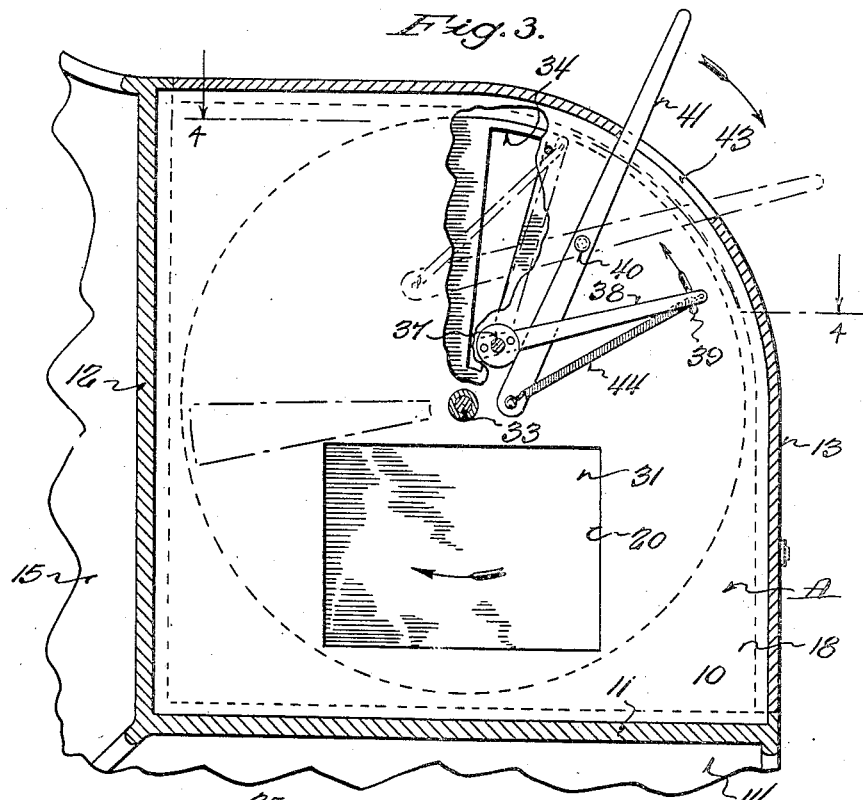
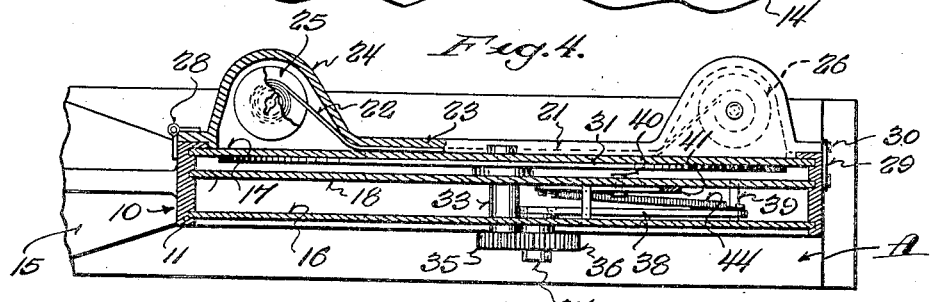
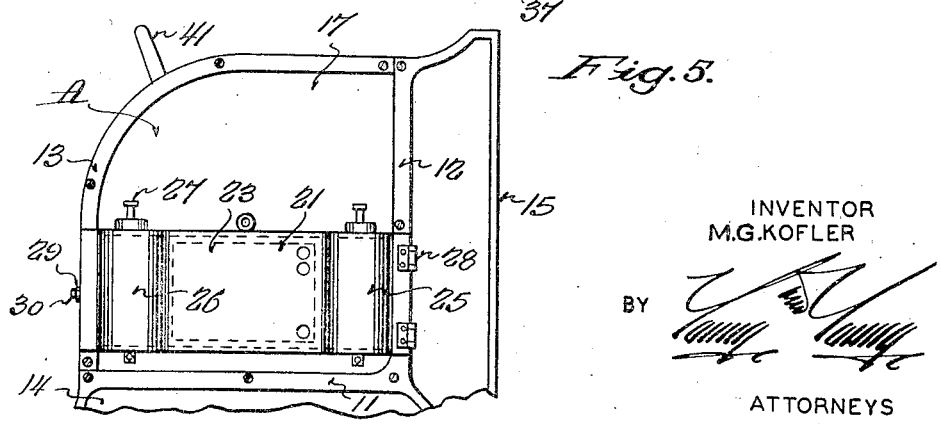
INVENTOR
M.G.KOFLER
BY
ATTORNEYS Patented May 18, 1943

2,319,330

UNITED STATES PATENT OFFICE 2,319,330

APPARATUS FOR MAKING ENLARGEMENTS AND STILL PICTURES FROM MOVING PICTURE FILM

Matt G. Kofler, Milwaukee, Wis., assignor of one-fourth to Oscar A. Held and one-fourth to Byron Sterr, both of Milwaukee, Wis.

Application April 26, 1941, Serial No. 390,592

4 Claims. (Cl. 88—24)

This invention appertains to means for obtaining "still" photographs from a moving picture film without cutting or otherwise damaging the film in any way.

In home or commercial photography, it is often desirable to have "still" pictures or enlargements of certain parts of the film. Not only is difficulty encountered in making these enlargements from the film, but difficulty is also experienced in selecting the desired part of the film for the "still" picture or enlargement.

It is, therefore, one of the primary objects of my invention to provide novel apparatus or a camera for use directly with a projector for effectively and expeditiously making the "still" or enlargement of the correct or desired subject matter from the film.

Another salient object of my invention is to provide a camera having a shutter on which the moving picture is projected, with means for actuating the shutter to snap the desired picture as shown on the shutter.

A further important object of my invention is to provide a camera having a combined shutter and screen, whereby the moving picture projector can be focused thereon to exhibit the pictures in plain view of the operator, so that the operator can quickly snap the desired picture when the same is exhibited to him on the combined shutter and screen.

A still further object of my invention is to provide an apparatus or camera which can be readily placed on a table or other support directly in front of a moving picture projector, so that the projector can be properly focused to exhibit the pictures on the combined shutter and screen to permit the quick taking of a desired enlargement or "still" picture projected from the film.

A still further important object of my invention is to provide a device of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 1 is a vertical sectional view through my apparatus, taken on the line 1—1 of Figure 2, looking in the direction of the arrows, the view also illustrating the position of the device relative to a moving picture projecting machine.

Figure 2 is a front elevational view of my improved apparatus taken on a smaller scale than Figure 1, parts of the view being shown broken away and in section to illustrate structural detail.

Figure 3 is a fragmentary, longitudinal, sectional view through my apparatus taken on the line 3—3 of Figure 1, looking in the direction of the arrows, the view being on the same scale as Figure 1 and illustrating the shutter operating mechanism.

Figure 4 is a sectional view taken on the line 4—4 of Figure 3, looking in the direction of the arrows.

Figure 5 is a fragmentary, rear, elevational view of my apparatus, taken on the same scale as Figure 2.

Figure 6 is an enlarged, fragmentary, detail, side, elevational view illustrating the means employed for holding the film carrier for the camera in tight locked engagement with the rear wall of the camera.

Referring to the drawings in detail, wherein similar reference characters designate corresponding parts throughout the several views, the letter A generally indicates my improved apparatus, and P a moving picture projecting machine with which my apparatus can be used.

The projector P per se forms no part of my present invention and can be considered as of the usual character now found in the open market.

My novel apparatus A comprises an open frame 10, which may include right-angularly extending rigid walls 11 and 12 and a removable wall section 13. The right-angularly extending rigid walls 11 and 12 have connected therewith or formed thereon right-angularly extending bases 14 and 15, respectively, and either one of these bases can be utilized for supporting the apparatus A in an upright position on a preferred support.

Firmly secured within the frame in spaced relation is a front wall 16, a rear wall 17, and an intermediate partition wall 18. All of these walls are detachably secured in the frame, and means is provided for forming a light seal between the walls and the frame. Hence, the edges of these walls can be received within grooves 19 formed in the inner faces of the rigid wall sections 11 and 12 and the removable wall section 13. All of the walls 16, 17, and 18 are provided with horizontally alined picture openings 20, for a purpose which will be later set forth.

The rear wall 17 has connected therewith the carrier or case 21 for the sensitized picture film 22. This case includes a back wall 23 and end pockets 24 for the spools 25 and 26 on which the film 22 is received. The film is fed from one spool to the other across the inner face of the back wall 23 of the case 21, and these spools can be detachably mounted in the pockets 24 in any preferred or conventional manner to permit the effective winding of the film from one spool to the other. However, it is preferred to have the spool holders at one side provided with spring-pressed plungers 27, so that different lengths of spools can be accommodated.

The case 21 is fitted tightly against the rear wall 17 of the apparatus around the picture opening 20 therein, so as to prevent the seeping of light from between the edges of the case and the rear wall 17. For the purpose of illustration, I have shown the case 21 connected by means of a hinge 28 at one end to the frame 10, and the other end of the case can be held against the plate 17 against accidental swinging movement by means of a cam hook 29 hingedly carried by the frame 10. This cam hook is adapted to be forced over a headed keeper pin 30 carried by the case 21. The rear wall of the case can be provided with means for permitting the operator to determine the position of the film 22 in the case.

Mounted for oscillating movement between the rear wall 17 and the intermediate partition wall 18 is a combined shutter and screen 31. This combined shutter and screen can be in the form of a disc and is fitted in relatively close relation to the inner surface of the rear wall 17. This disc can be formed from aluminum or other light-reflecting material. The axial center of the disc 31 is secured to a hub 32 formed on or secured to an operating shaft 33. This operating shaft 33 extends through the walls 16, 17, and 18, and these walls carry suitable bearings therefor. The disc 31 is provided with a radially extending slot 34, which is normally held above the openings 20 of the walls 16, 17, and 18, and the disc is adapted to be rotated for moving the slot 34 past the openings 20 at the desired time.

The means for operating the disc 31 includes a pinion 35 keyed or otherwise secured to the forward end of the shaft 33, and this pinion has meshing therewith an operating gear 36 keyed or otherwise secured to a stub shaft 37 rotatably mounted in a bearing carried by the front wall 16. The inner end of the stub shaft 37 has rigidly secured thereto a radially extending operating crank 38. This crank is arranged between the walls 16 and 18, and swinging movement of the crank is limited by spaced stop pins 39 carried by the walls 16 and 18.

Rockably mounted intermediate its ends on a pivot pin 40 is an operating hand lever 41. The pivot pin 40 can be carried by the walls 16 and 18, and the outer end of the hand lever 41 extends through a slot 42 formed in the removable wall section 13 of the frame 10. The inner end of the hand lever 41 and the outer end of the crank 38 are operatively connected together by means of a contractile coil spring 44.

To operate the shutter 31 so as to cause the moving of the slot 34 therein rapidly past the picture opening 20, the hand lever 41 is actuated. Referring to Figures 2 and 3 and considering that the hand lever 41 is in its raised position, then the hand lever 41 is swung down to its lowered position, as illustrated in dotted lines in Figure 3. This moves the inner end of the lever 41 to an elevated position, and, consequently, the spring 44 quickly pulls the crank 38 to a raised position, as shown in dotted lines in Figure 3. The movement of the crank operates the gear 36, which, in turn, operates the pinion 35, the shaft 33, and the shutter 31. Consequently, the shutter 31 rotates in a clockwise direction (see the arrow in Figure 3), and the slot 34 is moved past the openings 20. When the shutter is to be operated again, the hand lever 41 is moved to its raised position, and, consequently, the spring 44 will exert a quick pull on the crank 38, and the shutter 31 will be moved in a counterclockwise direction, and the slot 34 will again move past the openings 20 to its normal raised position.

In use of my apparatus, the projector P is set the desired distance (usually, about 3 feet) away from my apparatus A, and the projector is focussed so that the projected picture from the film will be shown through the openings 20 in the walls 16 and 18 on the shutter 31, which, as stated, also acts as a screen.

Considering that the film 22 has been placed in the case 21 and the spools 25 and 26 have been actuated to move the film to its correct position across the opening 20 in the rear wall 17, then the operator of the moving picture projector watches the moving picture on the combined shutter and screen 31. When a desired picture is observed, the hand lever 41 is quickly actuated, and the shutter will be moved so that the projected picture will be momentarily impressed upon the film 22. The film 22 is again advanced to a new position, and the shutter can again be actuated when it is desired to take another "still" picture.

After the desired number of pictures has been taken, the film 22 is removed from the case 21 in the ordinary way and developed in accordance with usual trade practices.

I prefer to form two bases 14 and 15 on the frame, so that my apparatus can be set on a table or other support with the openings 20 running horizontally, or with the openings 20 running vertically.

By focusing the projector P or moving the projector back and forth, the size of the pictures can be changed to a certain degree.

Various changes in details may be made, which do not depart from the spirit and scope of my claims, and what I claim as new is:

1. An apparatus for making enlargements and "still" pictures from a moving picture film comprising, a frame, a supporting wall carried by the frame having an elongated picture opening therein, right-angularly extending bases on the frame, whereby the frame can be placed in two different positions on a support, a sensitized film carrier, means releasably securing the film carrier in intimate contact with the rear face of the supporting wall around the picture opening, means for advancing the sensitized film past the picture opening, an oscillating shutter mounted in front of said supporting wall having a light slot therein for movement past the picture opening, said shutter forming a screen for the image of pictures projected from a film by a moving picture projecting machine, and manual means for actuating the shutter.

2. An apparatus for making enlargements and "still" pictures from a moving picture film comprising, a frame, a supporting wall carried by the frame having an elongated picture opening therein, right-angularly extending bases on the frame, whereby the frame can be placed in two different positions on a support, a sensitized film carrier, means releasably securing the film carrier in intimate contact with the rear face of the supporting wall around the picture opening, means for advancing the sensitized film past the picture opening, an oscillating shutter mounted in front of said supporting wall having a light slot therein for movement past the picture opening, said shutter forming a screen for the image of pictures projected from a film by a moving picture projecting machine, manual means for actuating the shutter, said means including a shaft supporting the shutter, a pinion on said shaft, a rotatable gear meshing with said pinion, a radially extending crank secured to the gear, a hand lever rockably mounted intermediate its ends, a hand grip on the outer end of said hand lever, a contractile coil spring connecting the outer end of the crank to the inner end of the hand lever, and means for limiting the movement of the crank.

3. An apparatus for making enlargements and "still" pictures from a moving picture film comprising, a frame, a supporting wall carried by the frame having an elongated picture opening therein, a sensitized film carrier, means releasably securing the film carrier in intimate contact with the rear face of the supporting wall around the picture opening, means for advancing the sensitized film past the picture opening, an oscillating shutter mounted in front of said supporting wall having a light slot therein for movement past the picture opening, said shutter forming a screen for the image of pictures projected from a film by a moving picture projecting machine, and manual means for actuating the shutter.

4. An apparatus for making enlargements and "still" pictures from a moving picture film comprising, a frame, a supporting wall carried by the frame having an elongated picture opening therein, a sensitized film carrier, means releasably securing the film carrier in intimate contact with the rear face of the supporting wall around the picture opening, means for advancing the sensitized film past the picture opening, an oscillating shutter mounted in front of said supporting wall having a light slot therein for movement past the picture opening, said shutter forming a screen for the image of a picture projected from a film by a moving picture projecting machine, manual means for actuating the shutter, said means including a shaft supporting the shutter, a pinion on said shaft, a rotatable gear meshing with said pinion, a radially extending crank secured to the gear, a hand lever rockably mounted intermediate its ends, a hand grip on the outer end of said hand lever, a contractile coil spring connecting the outer end of the crank to the inner end of the hand lever, and means for limiting the movement of the crank.

MATT G. KOFLER.